United States Patent
Soda et al.

(10) Patent No.: US 9,319,849 B2
(45) Date of Patent: Apr. 19, 2016

(54) CONTENT OUTPUT SYSTEM

(71) Applicant: FUJITSU TEN LIMITED, Kobe-shi, Hyogo (JP)

(72) Inventors: Tomofumi Soda, Kobe (JP); Tadayuki Yamashita, Kobe (JP); Satoru Ikeda, Kobe (JP); Toshihiro Murata, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 14/537,091

(22) Filed: Nov. 10, 2014

(65) Prior Publication Data

US 2015/0163644 A1 Jun. 11, 2015

(30) Foreign Application Priority Data

Dec. 10, 2013 (JP) ................................. 2013-254744

(51) Int. Cl.
| | |
|---|---|
| *H04B 1/38* | (2015.01) |
| *H04M 1/00* | (2006.01) |
| *H04W 4/06* | (2009.01) |
| *H04W 4/00* | (2009.01) |
| *H04W 76/02* | (2009.01) |

(52) U.S. Cl.
CPC ................ *H04W 4/06* (2013.01); *H04W 4/008* (2013.01); *H04W 76/023* (2013.01)

(58) Field of Classification Search
None
See application file for complete search history.

(56) References Cited

U.S. PATENT DOCUMENTS

2004/0215568 A1 * 10/2004 Fukushima ............ G06Q 30/02 705/51

FOREIGN PATENT DOCUMENTS

JP A-2008-021337 1/2008

* cited by examiner

*Primary Examiner* — Dominic Rego
(74) *Attorney, Agent, or Firm* — Oliff PLC

(57) ABSTRACT

A content output system includes a plurality of mobile terminals that store content data, and a content display apparatus that is communicatively connected to the plurality of mobile terminals, obtains the content data from the mobile terminals, and displays the content data on a display. The content display apparatus displays the content data on the display in association with the mobile terminals that store the content data.

13 Claims, 15 Drawing Sheets

| PLAYLIST | | |
|---|---|---|
| abcd | AAA | ZZZ |
| efgh | AAA | ZZZ |
| uvwx | AAA | ZZZ |
| ... | ... | ... |

FIG.3A

| PLAYLIST | | |
|---|---|---|
| mnop | BBB | YYY |
| qrst | BBB | YYY |
| ... | ... | ... |

FIG.3B

| PLAYLIST | | |
|---|---|---|
| ijkl | CCC | XXX |
| ... | ... | ... |

FIG.3C

| INTEGRATED PLAYLIST | | | |
|---|---|---|---|
| abcd | AAA | ZZZ | 2a |
| efgh | AAA | ZZZ | 2a |
| uvwx | AAA | ZZZ | 2a |
| mnop | BBB | YYY | 2b |
| qrst | BBB | YYY | 2b |
| ijkl | CCC | XXX | 2c |
| ... | ... | ... | ... |

RESERVATION LIST

| TITLE | ARTIST | STORAGE TERMINAL | REPLAY TERMINAL | CONNECTION FLAG | BATTERY RESIDUAL QUANTITY | DISCONNECTION TIME | REPLAY STATUS |
|---|---|---|---|---|---|---|---|
| qrst | YYY | 2b | 2b | ON | 4 | 0 | REPLAY |
| ijkl | XXX | 2b/2c | 2c | ON | 3 | 0 | REPLAY |
| uvwx | ZZZ | 2a | 2a | OFF | 2 | 5 | PENDING |
| mnop | YYY | 2b | 2b | ON | 4 | 0 | REPLAY |

CONTENT OUTPUT SYSTEM

BACKGROUND OF THE INVENTION

1. Field of the Invention

The invention relates to a technology for outputting music contents or the like.

2. Description of the Background Art

Conventionally, a technology for connecting a mobile terminal and an in-vehicle device by wire or wirelessly and for outputting the music contents or other contents stored in the mobile terminal from the in-vehicle device is known. In the case where a plurality of mobile terminals carried into a vehicle and each of the mobile terminals is connected to the in-vehicle device wirelessly, the contents stored in one of the mobile terminals is output from the in-vehicle device. In this case, the list of available contents is displayed on the in-vehicle device so that a user can grasp available contents for output.

However, in the state where the plurality of mobile terminals are connected to the in-vehicle device, the display list of the contents includes all of the contents stored in the individual mobile terminals. It is impossible for a user to grasp which of the mobile terminals includes target contents on the display list. In the case where plural mobile terminals store the same contents, the list including all of the contents stored in the individual mobile terminals is not convenient for a user due to redundant display of the same contents.

SUMMARY OF THE INVENTION

According to one aspect of the invention, a content output system includes a plurality of mobile terminals that store content data, and a content display apparatus that is communicatively connected to the plurality of mobile terminals, obtains the content data from the mobile terminals, and displays the content data on a display. The content display apparatus displays the content data on the display in association with the mobile terminals that store the content data.

Since the content data are displayed in association with the mobile terminals that store the content data, even when the content data stored in the plurality of mobile terminals are displayed in one screen, it is easy to grasp in which of the mobile terminals each of the content data is stored.

According to another aspect of the invention, on the content output system, in a case where the plurality of mobile terminals store a same piece of content data, the content display apparatus displays the same piece of content data in association with each of the plurality of mobile terminals storing the same piece of content data.

Since the same piece of content data is displayed in association with the mobile terminals storing the same piece of content data, it is easy to grasp the mobile terminals storing the same piece of content data.

Therefore, the object of the invention is, even in the case where a list of contents is displayed while a plurality of mobile terminals and an in-vehicle device are connected, to provide the technology for facilitating grasping of the mobile terminals storing the contents, and for avoiding redundant display of the same contents.

These and other objects, features, aspects and advantages of the invention will become more apparent from the following detailed description of the invention when taken in conjunction with the accompanying drawings.

BRIEF DESCRIPTION OF THE DRAWINGS

FIGS. 3A, 3B and 3C show playlist examples.

FIG. 4 shows an example of an integrated playlist.

FIG. 14 shows an example of a reservation list.

DESCRIPTION OF THE EMBODIMENTS

Hereinafter, some embodiments of the invention are explained based on attached drawings.

1. Embodiment

1-1. Outline of System

Figure 1:
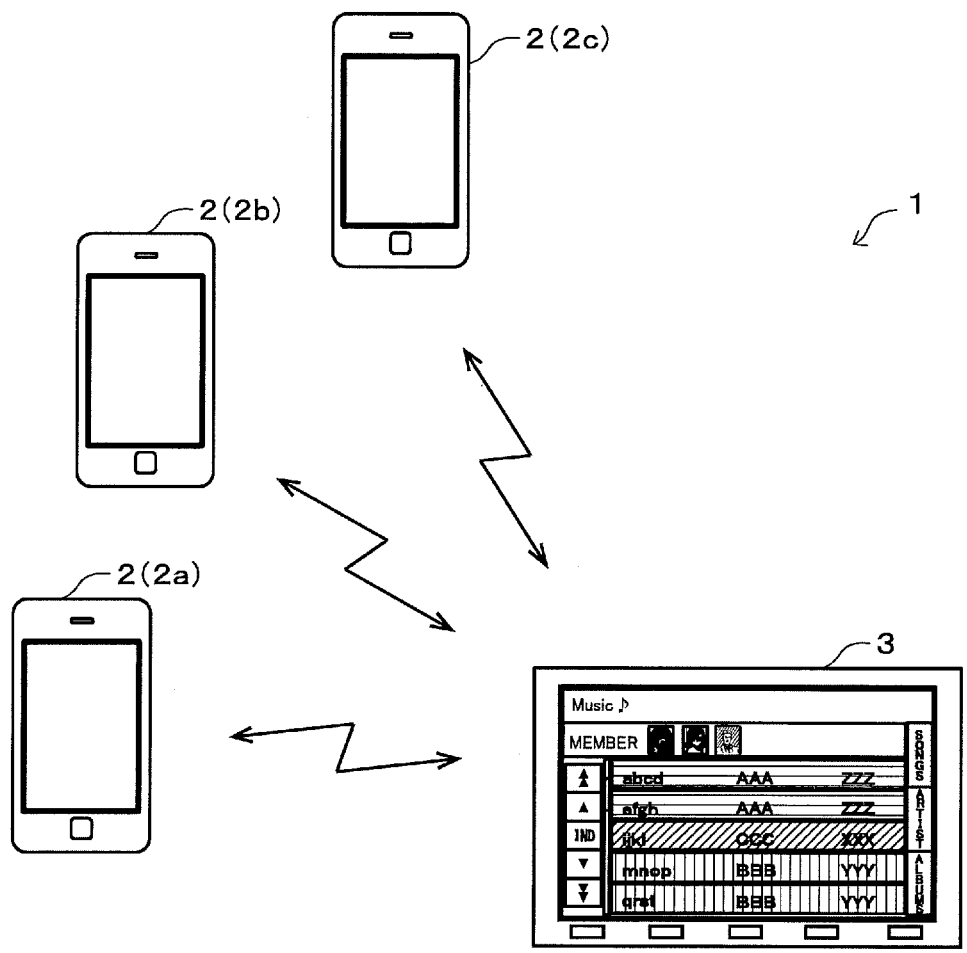
FIG. 1 shows an outline of a content output system.

FIG. 1 shows an outline of a content output system 1 of the embodiment. The content output system 1 includes a plurality of mobile terminals 2 (e.g., 2a, 2b, 2c) and an in-vehicle device 3. The embodiment is explained by use of an example case where each of the plurality of mobile terminals 2 (e.g., 2a, 2b, 2c) carried into a vehicle is wirelessly connected to the in-vehicle device 3. Hereafter, "mobile terminal 2" or "mobile terminals 2" is used for explanation of a plurality of mobile terminals in a batch while "mobile terminal 2a" or the like is used for explanation of an individual mobile terminal.

The mobile terminal 2 is a portable electronic apparatus carried by a user, for example, a smartphone, a tablet, or a mobile phone. The mobile terminal 2 stores content data such as music contents and moving video contents, and is capable of replaying and stopping contents and skipping music in accordance with user's operation. The mobile terminal 2 which is capable of communicating with the in-vehicle device 3 exchanges data with the in-vehicle device 3.

The in-vehicle device 3 is an electronic apparatus that displays on a display unit the list of the contents stored in the individual mobile terminals 2. Further, the in-vehicle device 3 is an electronic apparatus that outputs outside the music contents, the moving video contents and the like stored in the individual mobile terminals 2. The in-vehicle device 3 in the embodiment is capable of displaying the contents in association with the mobile terminal that includes the contents, or displaying a list having no redundancy even in the case where a plurality of mobile terminals store the same contents. In addition, the in-vehicle device 3 is capable of outputting sound from a speaker and displaying moving video on the display unit. Thus, in the embodiment, content replay, content display and the like are collectively called "content output." That is, the in-vehicle device 3 in the embodiment functions as a content display apparatus and also as a content output apparatus.

The in-vehicle device 3 is capable of communicating with the mobile terminal 2 carried into a vehicle, exchanging data with the connected mobile terminal 2. Any types of electronic apparatuses, for example, a so-called fitting-type electronic apparatus which is set in an opening on a dashboard in a vehicle, or an electronic apparatus which is set on a dashboard by use of an installation member, may be available as the in-vehicle device 3, as long as a user in a vehicle can watch the image displayed on the display unit of the electronic apparatus.

As above, on the content output system 1 of the embodiment, the in-vehicle device 3 is connected by wire or wirelessly to the plurality of mobile terminals 2 carried into a vehicle, and is thereby capable of displaying the list of the contents stored in the individual mobile terminals 2 so as to facilitate grasping of content information. Hereafter, the configuration and the processing of the content output system 1 are detailed.

1-2. Configuration of Mobile Terminal

Figure 2:
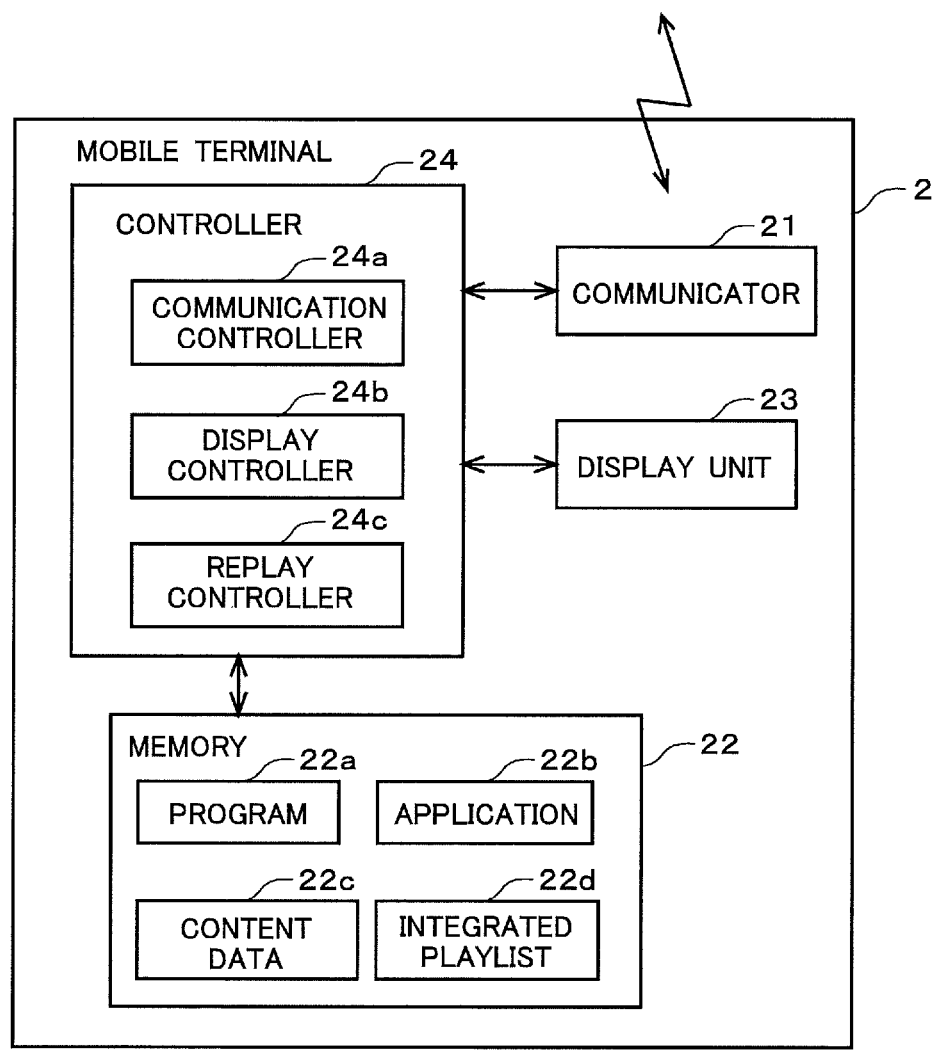
FIG. 2 shows a schematic block diagram of a mobile terminal.

First, the configuration of the mobile terminal 2 is explained. FIG. 2 shows a schematic block diagram of the mobile terminal 2. The mobile terminal 2 mainly includes a communicator 21, a memory 22, a display unit 23 and a controller 24.

The communicator 21 is communicatively connected to the in-vehicle device 3 via wireless communication such as Wi-Fi (registered trade mark) so as to exchange various data with the in-vehicle device 3. The communicator 21 may adopt other wireless communication standard than Wi-Fi, such as Bluetooth (registered trade mark), or ZigBee (registered trade mark). The mobile terminal 2 may be connected to the in-vehicle device 3 via the communicator 21 by wire, not wirelessly.

The memory 22, which is a nonvolatile memory such as a flash memory, stores a program 22a for control, an application 22b, content data 22c, an integrated playlist 22d, and the like. With the execution of the application 22b in accordance with user's operation, the function of the application 22b is performed. The application for replaying and stopping music, moving video and the like corresponds to the application 22b.

The content data 22c is the data relevant to music contents, moving video contents or the like. That is, it can be said that the content data 22c is music data or moving video data. The music data or the moving video data includes the data of a title, an artist name and other data, in addition to the data of music itself or moving video itself. Hereinafter, for convenience, the music data is used as an example in explanation.

The integrated playlist 22d is the playlist into which all of the music data stored in the mobile terminal 2 connected to the in-vehicle device 3 are integrated. That is, in the case where the plurality of mobile terminals 2 are connected to the in-vehicle device 3, the integrated playlist 22d is one playlist into which all of the playlists each of which includes the music data stored in each of the mobile terminals 2 are integrated. In the integrated playlist 22d, each of the music data is associated with the mobile terminal 2 that stores the music data.

Here is a concrete explanation about the integrated playlist 22d based on FIG. 3A, FIG. 3B, FIG. 3C and FIG. 4. FIG. 3A, FIG. 3B and FIG. 3C show examples of the playlist stored in the individual mobile terminals 2. FIG. 3A shows the playlist of the music data stored in the mobile terminal 2a. FIG. 3B shows the playlist of the music data stored in the mobile terminal 2b. FIG. 3C shows the playlist of the music data stored in the mobile terminal 2c. As shown in FIG. 3A, FIG. 3B and FIG. 3C, each of the mobile terminals 2 stores the playlist of the music data stored in the own mobile terminal.

FIG. 4 shows an example of the integrated playlist 22d stored in the individual mobile terminals 2 and the in-vehicle device 3. As shown in FIG. 4, the integrated playlist is one playlist into which all of the music data stored in the individual mobile terminals 2 connected to the in-vehicle device 3 are integrated. That is, the in-vehicle device 3 prepares one playlist by integrating all of the playlists of the individual mobile terminals 2. After the preparation, the integrated playlist is transmitted to the mobile terminals 2 respectively. As a result, the in-vehicle device 3 and all of the mobile terminals 2 have the same integrated playlist.

In the integrated playlist, the title, the album name and the artist name of music data, the mobile terminal that stores the music data and other data are associated. In an example, the integrated playlist shown in FIG. 4 shows that the mobile terminal 2a stores a piece of music data whose title is "abcd," album name is "AAA" and artist name is "ZZZ." As above, in the integrated playlist, each of the music data is associated with the location in which the music data is stored (the mobile terminal that stores the music data). Any information is available as the storage location, as long as the location in which the music data is stored can be specified by the information. Thus, storage location URL or other information may be used. Further, the integrated playlist may include file format data of the music data or other data.

In FIG. 2 again, the display unit 23 displays the display data or the like prepared based on the integrated playlist. The display data is explained later. For example, a liquid crystal display unit or an organic EL display unit may be used as the display unit 23.

The controller 24 is a microcomputer that includes, for example, a CPU, RAM and ROM, controlling the entire mobile terminal 2. The CPU of the controller 24 executes the program 22a stored in the memory 22 (by performing an arithmetic processing based on the program 22a), and thereby various functions necessary for the controller 24 are performed.

A communication controller 24a, a display controller 24b and a replay controller 24c shown in FIG. 2 are a part of the functions of the controller 24 to be performed by the execution of the program 22a.

The communication controller 24a controls the communication between the mobile terminal 2 and the in-vehicle device 3. Specifically, the communication controller 24a controls the data exchange between the mobile terminal 2 and the in-vehicle device 3. In an example, the communication controller 24a controls the communicator 21 to transmit the data of the playlist stored in the own mobile terminal to the in-vehicle device 3.

The display controller 24b performs control to display image data, character data or the like on the display unit 23. In an example, for displaying the integrated playlist on the display unit 23, the display controller 24b performs control to prepare the display data so as to facilitate grasping the association between each of the music data and the user (one of the mobile terminals 2) that stores the music data, and to display the prepared display data on the display unit 23.

The replay controller 24c performs processing for replaying and stopping music contents and other processing. Specifically, the replay controller 24c converts the content data 22c that has been selected as a replay object or the like into the format data (output data) that is available for output from the in-vehicle device 3. The content data 22c stored in the memory 22 is compressed data in a certain format, not available for output as is. Thus, the mobile terminal 2 performs signal processing for conversion into the data available for output.

1-3. Configuration of in-Vehicle Device

Figure 5:
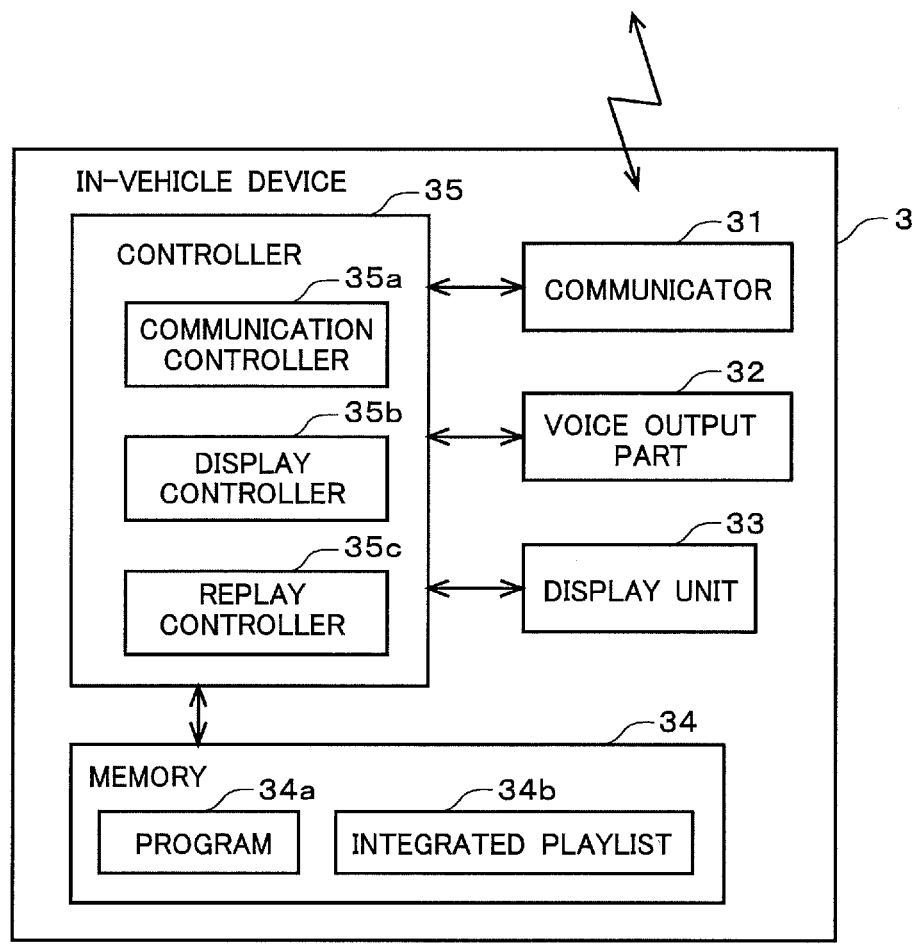
FIG. 5 shows a schematic block diagram of an in-vehicle device.

Next, the in-vehicle device 3 is explained. FIG. 5 shows a schematic block diagram of the in-vehicle device 3. The in-vehicle device 3 mainly includes a communicator 31, a voice output part 32, a display unit 33, a memory 34 and a controller 35.

The communicator 31 is communicatively connected to the mobile terminal 2 via wireless communication such as Wi-Fi so as to exchange various data with the mobile terminal 2. The communicator 31 may adopt other wireless communication standard than Wi-Fi, or communication by wire. This is the same as the communicator 21 of the mobile terminal 2.

The voice output part 32 is a speaker that outputs outside voice data (analog voice waveform signals) after the mobile terminal 2 has converted music data into output data. As above, the in-vehicle device 3 outputs outside through the voice output part 32 the voice data that are a part of the output data into which the mobile terminal 2 has converted music data, and thereby a user can enjoy the music corresponding to the music data.

The display unit 33 displays video data that are a part of the output data into which the mobile terminal 2 has converted the music data. In addition, the display unit 33 displays various data including the display data prepared based on an integrated playlist 34b. The display data is explained later. For example, a liquid crystal display unit or an organic EL display unit may be used as the display unit 33.

The memory 34, which is a nonvolatile memory such as a flash memory, stores a program 34a for control, the integrated playlist 34b, etc. As explained above, the integrated playlist 34b is the playlist into which the in-vehicle device 3, in the case where the plurality of mobile terminals 2 are connected to the in-vehicle device 3, has integrated all of the playlists of the music data stored in the individual mobile terminals 2. The integrated playlist 34b stored in the memory 34 is identical with the integrated playlist 22d stored in the mobile terminal 2. That is, all of the mobile terminals 2 and the in-vehicle device 3 store the same integrated playlist respectively.

The controller 35 is a microcomputer that includes, for example, a CPU, RAM and ROM, controlling the entire in-vehicle device 3. The CPU of the controller 35 executes the program 34a stored in the memory 34 (by performing an arithmetic processing based on the program 34a), and thereby various functions necessary for the controller 35 are performed.

A communication controller 35a, a display controller 35b and a replay controller 35c shown in FIG. 5 are a part of the functions of a controller 35 to be performed by the execution of the program 34a.

The communication controller 35a controls the communication between the mobile terminal 2 and the in-vehicle device 3. Specifically, the communication controller 35a controls the data exchange between the mobile terminal 2 and the in-vehicle device 3. In an example, the communication controller 35a controls the communicator 31 to transmit the data of the integrated playlist to each of the mobile terminals 2. In addition, the communication controller 35a determines whether the communication with the mobile terminal 2 is continued or released.

The display controller 35b performs control to display image data, character data or the like on the display unit 33. In an example, the display controller 35b performs control to display on the display unit 33 the display data prepared based on the integrated playlist. Specifically, the display controller 35b, for displaying the integrated playlist on the display unit 33, prepares the display data to facilitate grasping the association between each of the music data and the user (one of the mobile terminals 2) that stores the music data, and displays the display data on the display unit 33. The display controller 35b, even in the case where the plurality of mobile terminals 2 store the same piece of music data, performs control to prepare the display data with no redundancy that facilitates grasping the user that stores the target data, and to display the prepared display data on the display unit 33.

The replay controller 35c performs processing for determining contents for replay among all of the contents stored in the plurality of the mobile terminals 2. Specifically, the replay controller 35c selects and determines music contents or other contents for replay so as not to unequally select the contents stored in a specific mobile terminal.

1-4. Processing on System

Figure 6:
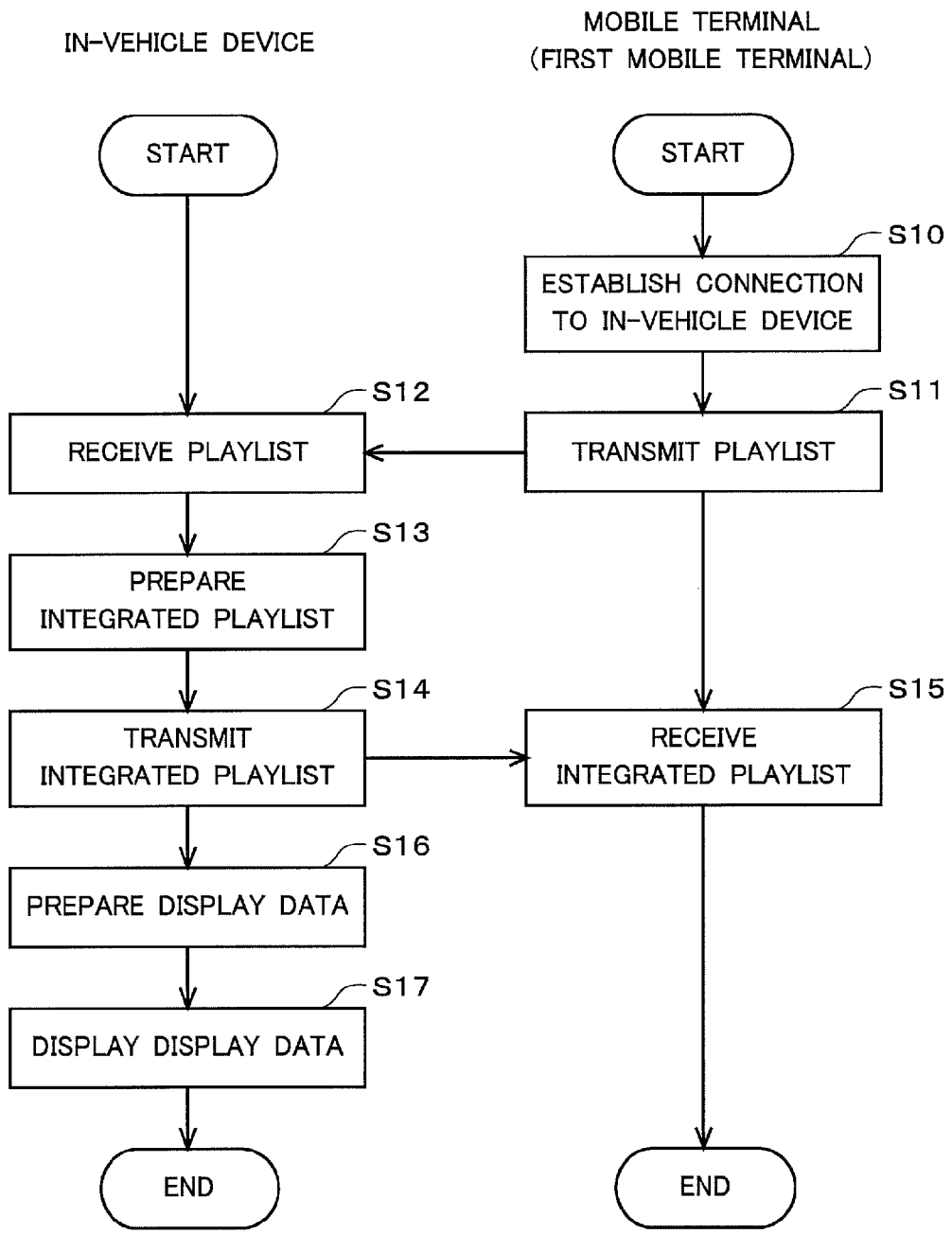
FIG. 6 shows a flowchart of processing by the content output system.

Next, processing on the content output system 1 is explained. FIG. 6 shows a flowchart of the processing on the content output system 1. The embodiment is explained by use of an example where three mobile terminals (the first mobile terminal 2a, the second mobile terminal 2b and the third mobile terminal 2c) are connected to the in-vehicle device 3. FIG. 6 shows the flowchart on the first mobile terminal 2a for explanation as a typical example because the three mobile terminals perform the same processing.

In the flowchart shown in FIG. 6, the processing is started when the first mobile terminal 2a is carried into a vehicle while the in-vehicle device 3 is on. When the first mobile terminal 2a is carried into the vehicle, the first mobile terminal 2a establishes connection to the in-vehicle device 3 (step S10). As explained above, the connection is established by wire or wirelessly. After establishing the connection to the in-vehicle device 3, the first mobile terminal 2a transmits the playlist of the music data stored in the own terminal to the in-vehicle device 3 (step S11). Then, the in-vehicle device 3 receives the playlist transmitted from the first mobile terminal 2a (step S12).

The in-vehicle device 3 obtains the playlists of the stored music data individually from the second mobile terminal 2b and the third mobile terminal 2c, as well as from the first mobile terminal 2a. After obtaining the playlists from all of the connected mobile terminals 2, the in-vehicle device 3 prepares the integrated playlist (step S13). That is, the in-vehicle device 3 integrates the data of all of the playlists obtained from the individual mobile terminals 2, and prepares the integrated playlist in which each of the content data (music data) is associated with the storing mobile terminal.

Then, the in-vehicle device 3 transmits the data of the prepared integrated playlist to the individual mobile terminals 2 (step S14); while each of the mobile terminals 2 receives the integrated playlist transmitted from the in-vehicle device 3. This allows the in-vehicle device 3 and the individual mobile terminals 2 to share the same integrated playlist.

Next, the in-vehicle device 3 prepares the display data of the integrated playlist (step S16). The display data is image data for displaying the data of the integrated playlist on the display unit. Specifically, the image data for the display data is prepared in consideration of user's visibility and easiness of grasping information for a user, showing content names, artist names and others in original arrangement and colors. Then, the in-vehicle device 3 displays the prepared display data on the display unit (step S17).

Figure 7:
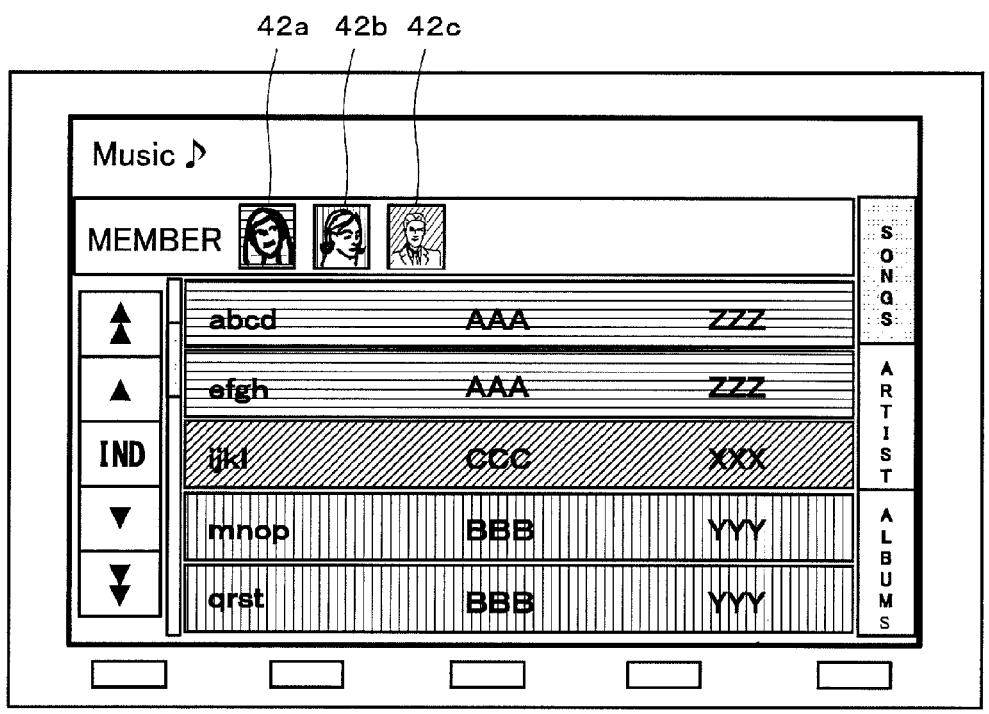
FIG. 7 shows a display example on the in-vehicle device.
Figure 8:
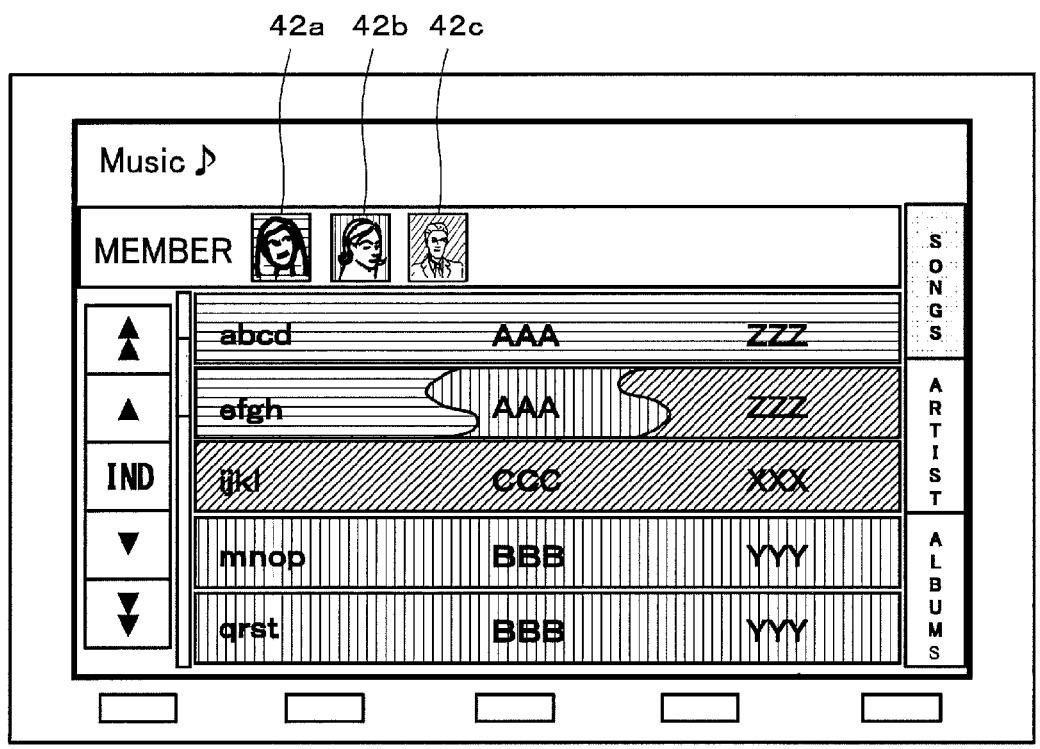
FIG. 8 shows another display example on the in-vehicle device.

Here the display data for display on the display unit is explained by use of the examples shown in FIG. 7 and FIG. 8. Each of FIG. 7 and FIG. 8 shows a display example of the display data. As shown in FIG. 7 and FIG. 8, the display data shows as members the users of the mobile terminals 2 connected to the in-vehicle device 3. Specifically, the display data displays an icon 42a expressing the user of the first mobile terminal 2a, an icon 42b expressing the user of the second mobile terminal 2b and an icon 42c expressing the user of the third mobile terminal 2c.

In addition, the display data displays the list of content data (music data). Specifically, the display data displays the titles, the album names and the artist names of the music data, each of which is associated with the mobile terminal 2 that stores the music data. For more concrete explanation of the association in the embodiment, in FIG. 7 the music data stored in the first mobile terminal 2a are shown in the boxes indicated with "horizontal lines," the music data stored in the second mobile terminal 2b is shown in the box with "vertical lines," and the music data stored in the third mobile terminal 2c are shown in the boxes with "slashes." Each of the icons 42a to 42c expressing each user of the mobile terminals 2 is also shown in the same manner, which associates the music data with each of the mobile terminals.

The association is not limited to this manner, and may be shown by color. In an example, the music data stored in the first mobile terminal 2a is shown in "red;" the music data stored in the second mobile terminal 2b is in "blue;" and the music data stored in the third mobile terminal 2c is in "yellow." In this case, each of the icons 42a to 42c expressing each user of the mobile terminals 2 is also shown in the same color: "red;" "blue;" or "yellow" (in an example, its background or its frame is shown in the applicable color).

Such display of the music data in association with the mobile terminal 2 (user) carried into a vehicle facilitates grasping which of the mobile terminals 2 stores target music data even on the integrated playlist including the music data stored in all of the mobile terminals 2.

In some case, a plurality of mobile terminals store the same piece of music data. In this case, if all of the music data stored in the individual mobile terminals are displayed, the same piece of music data may be displayed redundantly. In the embodiment, the music data are displayed so as not to have any redundancy in terms of the same piece of music data and so as to facilitate grasping the mobile terminal storing the target music data. FIG. 8 shows a concrete example.

In FIG. 8, the music data of the title "efgh" is stored in the first mobile terminal 2a, the second mobile terminal 2b and the third mobile terminal 2c. As shown in FIG. 8, even in the case where the plurality of mobile terminals 2 store the same piece of music data, the music data is displayed in one box partially showing the association with the individual mobile terminals storing the music data. Specifically, the box displaying "efgh" is divided into three parts: the first part indicated with "horizontal lines" expressing storage in the first mobile terminal 2a; the second part indicated with "vertical lines" expressing storage in the second mobile terminal 2b; and the third part indicated with "slashes" expressing storage in the third mobile terminal 2c. Also, in the case where the association with the storing mobile terminals is shown by color, the association is shown in the same manner. That is, each of the three parts is shown in "red," "blue" or "yellow."

In the embodiment as above, in the case where a plurality of mobile terminals store the same piece of music data, the same piece of music data is displayed in association with the plurality of mobile terminals storing the piece of music data. That is, the display data is prepared based on the music data. Further, the area displaying information on the music data is divided into parts, and each part is displayed in association with each of the mobile terminals. This can afford the display of the mobile terminals storing the same piece of music data without any redundancy.

When any of the mobile terminals connected to the in-vehicle device 3 becomes disconnected, the music data stored in the disconnected mobile terminal is no longer available for replay. Thus, when one of the mobile terminals becomes disconnected in the state where the display data is displayed on the display unit, the display of the music data stored in the disconnected mobile terminal is changed to gray-out display. This is explained based on FIG. 9 and FIG. 10.

Figure 9:
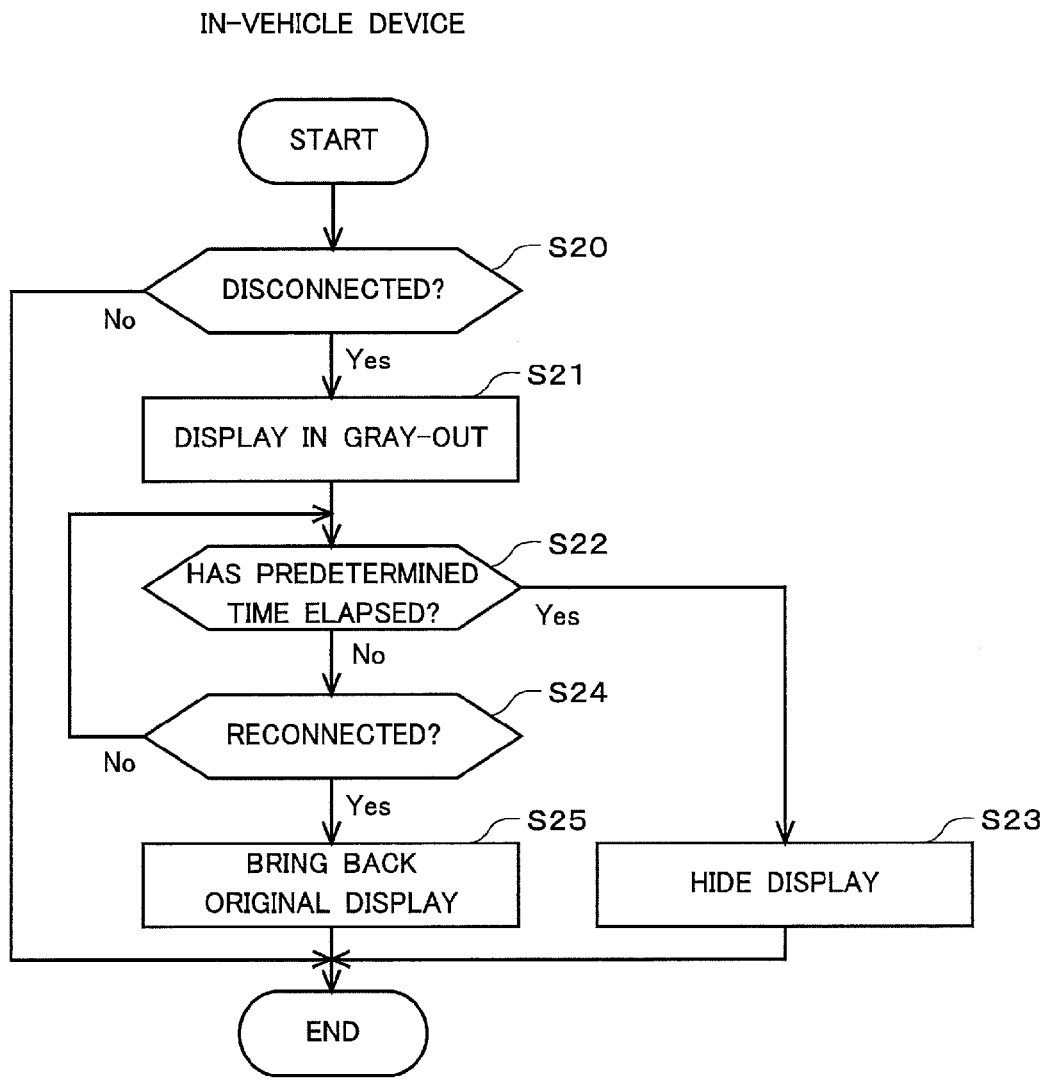
FIG. 9 shows a flowchart of processing on the in-vehicle device.

FIG. 9 shows the flowchart of processing in the case where one of the mobile terminals 2 becomes disconnected. In the flowchart shown in FIG. 9, the processing is started in the state where the mobile terminals 2 are connected to the in-vehicle device 3 and the display data is displayed on the display unit.

The in-vehicle device 3 determines whether any of the mobile terminals 2 is disconnected (step S20). When none of the mobile terminals 2 is disconnected (No at the step S20), the processing is ended. In this case, whether or not any of the mobile terminals 2 are disconnected may be determined periodically. When any of the mobile terminals 2 is disconnected (Yes at the step S20), the music data stored in the disconnected mobile terminal 2 are grayed out (step S21).

Figure 10:
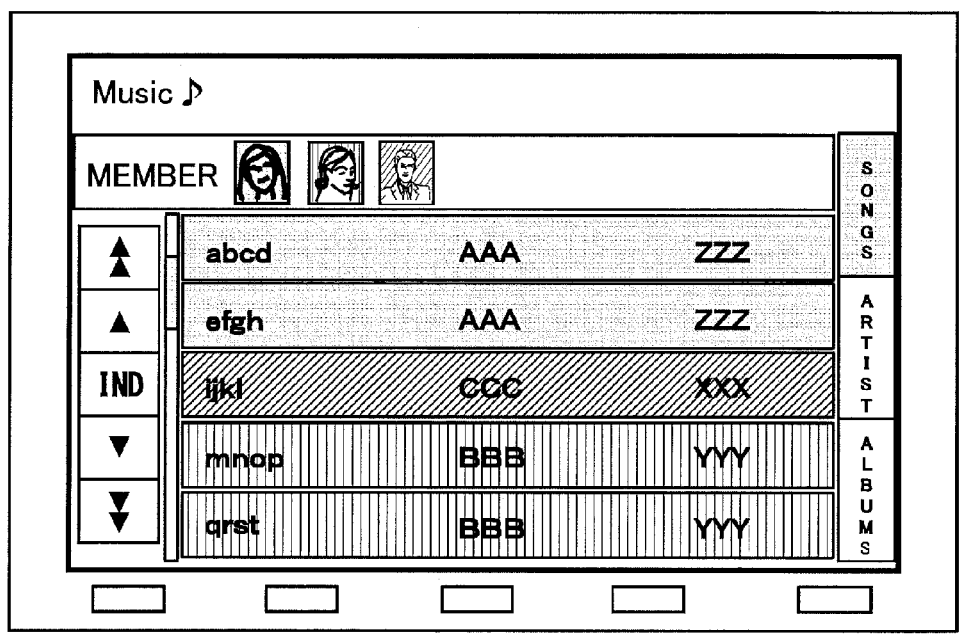
FIG. 10 shows another display example on the in-vehicle device.
Figure 11:
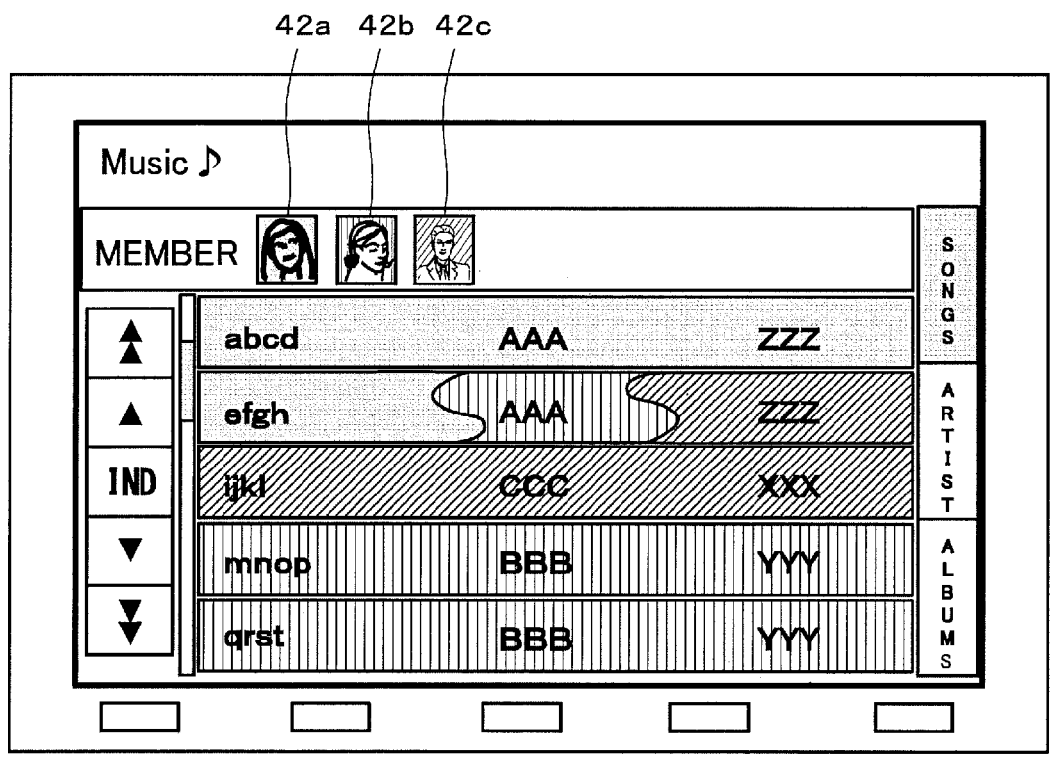
FIG. 11 shows another display example on the in-vehicle device.

Here, the processing for gray-out displaying the music data is concretely explained based on FIG. 10 and FIG. 11. Each of FIG. 10 and FIG. 11 shows a display example of the case where the first mobile terminal 2a is disconnected. As shown in FIG. 10, when the first mobile terminal 2a becomes disconnected, the in-vehicle device 3 grays out the music data stored in the first mobile terminal 2a (title "abcd" and title "efgh"). This facilitates grasping that the grayed-out music data are the music data stored in the disconnected mobile terminal. In addition, the icon expressing the user of the first mobile terminal 2a is grayed out, which can associate the user with the disconnected mobile terminal.

As shown in FIG. 11, in the case where the same piece of music data is stored in the plurality of mobile terminals 2, only the parts corresponding to the disconnected mobile terminal are grayed out. This facilitates grasping disconnected mobile terminals and connected mobile terminals respectively.

In FIG. 9 again, the in-vehicle device 3 determines whether predetermined time has elapsed or not (step S22). After the predetermined time has elapsed (Yes at the step S22), the in-vehicle device 3 hides the grayed-out music data (step S23). It is advisable to carry out this processing for hiding the grayed-out music data after predetermined time elapses. This is because unavailable music data are displayed endlessly if the music data stored in a disconnected mobile terminal is continued to be grayed out indefinitely.

In the case where the predetermined time does not elapse yet (No at the step S22), the in-vehicle device 3 determines whether the disconnected mobile terminal is connected again or not (step S24). This is because there is a possibility that the disconnection of the mobile terminal may be just temporary and the mobile terminal may be connected again in a short period of time. Thus, the in-vehicle device 3 monitors the connection. When the mobile terminal is not connected again (No at the step S24), the in-vehicle device 3 monitors whether predetermined time has elapsed or not.

When the disconnected mobile terminal is connected again (Yes at the step S24), the in-vehicle device 3 brings back the original display (step S25). That is, the in-vehicle device 3 displays the music data that has been grayed out, as displayed before the disconnection of the mobile terminal. The concrete original display is as shown in FIG. 7.

As explained so far, when a mobile terminal becomes disconnected, the music data stored in the mobile terminal is grayed out for predetermine time, not hidden immediately. This allows original display data to be displayed again without re-creation of the display data in the case of temporary disconnection. When once-disconnected mobile terminal is not connected again in predetermined time, the corresponding music data are hidden. This prevents unavailable music data from being displayed for a long time.

Even when a mobile terminal becomes disconnected, it is advisable to store the display style showing the association with the mobile terminal. In an example, when the first mobile terminal 2*a* becomes disconnected, it is advisable to store the display style of "vertical lines" showing the music data stored in the first mobile terminal 2*a*, and to use the same style of "vertical lines" for display in the case of reconnection.

The same is true as for the case of displaying the association by color. In the case where "red" is used for displaying the music data stored in the first mobile terminal 2*a*, the color shall be stored for re-display in "red" in the case of reconnection. As above, storing a display style in association with a mobile terminal (user) allows the mobile terminal to be displayed in the same display style as before even when the mobile terminal is displayed at another time. This allows a user to recognize that the same mobile terminal has been connected again.

The next explanation is about the configuration where the display data is prepared based on the integrated playlist for display and each user of the mobile terminals 2 can set the music data stored in user's terminal as closed data. In the explanation above, the in-vehicle device 3 prepares the display data including all of the music data stored in individual mobile terminals 2. However, another configuration may be adopted. In another configuration, when a user wants to hide any of the music data to other members among the music data stored in user's mobile terminal, the user can set specific music data as closed data.

Figure 12:
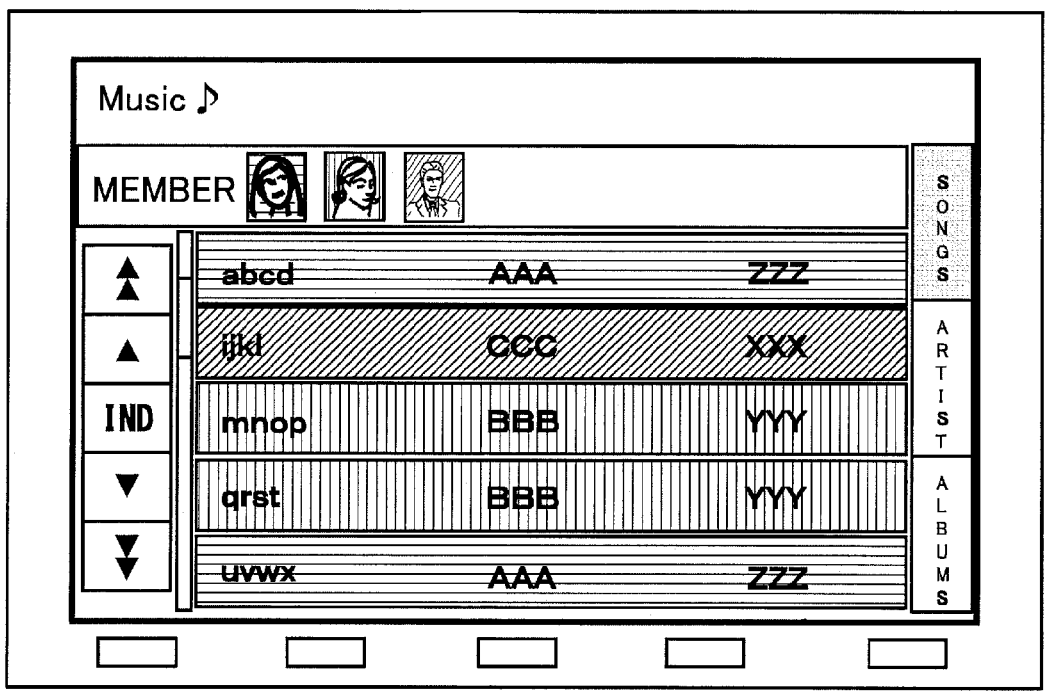
FIG. 12 shows another display example on the in-vehicle device.

Here is an example where the first mobile terminal 2*a* stores the music data of "abcd," "efgh" and "uvwx." When the user of the first mobile terminal 2*a* sets the music data of "efgh" as closed data, the condition of nondisclosure is provided to the applicable music data in the playlist transmitted to the in-vehicle device 3. Then, the in-vehicle device 3 prepares the display data of the music data to be opened, excluding the music data with the condition of nondisclosure. As a result, the music data with the condition of nondisclosure is hidden. That is, without setting of any data as closed data, the music data are displayed as shown in FIG. 7; while with setting of the music data of "efgh" as closed data, the applicable music data is not displayed, as shown in FIG. 12.

The condition of nondisclosure is also provided to the applicable music data included in the integrated playlist shared by the individual mobile terminals 2. Thus, in the case where the integrated playlist is displayed on the mobile terminals other than the mobile terminal storing the applicable music data, the music data with the condition of nondisclosure is hidden. That is, the applicable music data is displayed on the mobile terminal on which nondisclosure setting is conducted (the mobile terminal originally storing the music data), but not displayed on other mobile terminals.

Figure 13A:
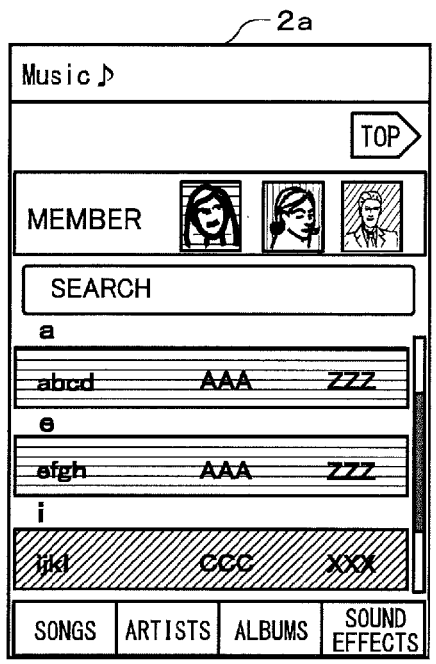
FIGS. 13A and 13B show display examples on the mobile terminal.
Figure 13B:
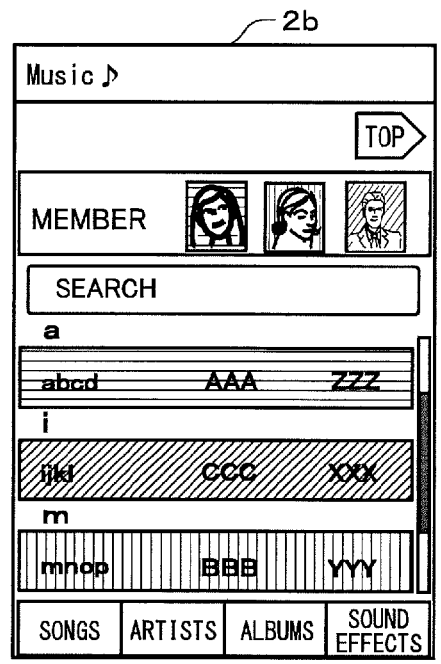

The following is a concrete explanation based on FIG. 13. FIG. 13A shows an example of a display screen on the first mobile terminal 2*a*. FIG. 13B shows an example of a display screen on a mobile terminal other than the first mobile terminal 2*a*. Each of the mobile terminals 2 prepares the display data for displaying the integrated playlist, in the same manner as the case of the in-vehicle device 3.

In an example, in the case where the user of the first mobile terminal 2*a* sets as closed data the music data of the title "efgh" stored in user's own terminal, the first mobile terminal 2*a* itself displays the integrated playlist including the music data of the title "efgh" as shown in FIG. 13A; while another mobile terminal prepares the display data with the music data of the title "efgh" hidden for display, as shown in FIG. 13B. As above, even in the case where a user does not want to disclose a piece of music data to other members, the user can hide the music data by setting the data as closed data.

Nondisclosure setting may be performed per group. In an example, nondisclosure setting is performed in the case where the mobile terminals connected to the in-vehicle device 3 correspond to the first mobile terminal 2*a*, the second mobile terminal 2*b* and the third mobile terminal 2*c*. That is, in the case where the user of the first mobile terminal 2*a* rides in a vehicle with the user of the second mobile terminal 2*b* and the user of the third mobile terminal 2*c*, nondisclosure setting is performed. Therefore, in the case where the user of the first mobile terminal 2*a* rides with a user other than the user of the second mobile terminal or the third mobile terminal, applicable music data is not set as closed data. This allows a specific piece of music data to be closed to a specific member.

In another example, when a specific piece of music data is set as closed data, the data of other mobile terminals connected at the time may be stored. In the case where the same mobile terminals become connected at another time, the music data may be automatically set as closed data.

Further, when the user sets a specific piece of music data as closed data, the indication that nondisclosure setting has been performed may be added to the display data to be displayed on user's terminal. The music data set as closed data is hidden on other users' mobile terminals, but displayed on user's own terminal. Thus, the user himself or herself may not tell the music data set as closed data from other music data. Additional indication that nondisclosure setting has been performed facilitates grasping the music data set as closed data by the user himself or herself.

The next explanation is about the method for replaying music data in the case where the plurality of mobile terminals 2 are connected to the in-vehicle device 3. In the embodiment, as explained above, three mobile terminals of the first mobile terminal 2*a*, the second mobile terminal 2*b* and the third mobile terminal 2*c* are connected to the in-vehicle device 3.

When a user in a vehicle operates the in-vehicle device 3 or one of the mobile terminals 2 to give an instruction to replay music, the in-vehicle device 3 or the mobile terminal 2 starts the processing for replay. In an example, first the in-vehicle device 3 outputs the instruction to replay music to the first mobile terminal 2*a*, and then the first mobile terminal 2*a* performs the processing for replay by selecting a piece of music at random among the music data stored in the own terminal. That is, the first mobile terminal 2*a* encodes the selected music data into prescribed-form digital data and transmits the digital data to the in-vehicle device 3. The in-vehicle device 3, after decoding the digital data received from the first mobile terminal 2*a*, generates output data by converting the decoded digital data into analog voice waveform signals through D/A processing or the like. Then, the in-vehicle device 3 outputs the generated output data as voice from the voice output part 32. This allows the user to listen to the music selected on the first mobile terminal 2a.

Another method may be available for replaying music data. In an example, the in-vehicle device 3 equipped with a decoder supporting a variety of compression systems may replay music data by another method. In this case, the in-vehicle device 3 can receive from the first mobile terminal 2a the music data in a compression format as is stored in the first mobile terminal 2a. Then, the in-vehicle device 3 can generate output data by extending and decoding the received music data, and performing D/A processing or the like. Then, the in-vehicle device 3 outputs the generated output data as voice from the voice output part 32 the same as above, which allows the user to listen to the music selected on the first mobile terminal 2a.

The in-vehicle device 3, after performing the processing for replaying the music data selected on the first mobile terminal 2a, outputs the instruction to replay music to the second mobile terminal 2b. The second mobile terminal 2b performs the processing for replay by selecting a piece of music at random among the music data stored in the own terminal. That is, in the same manner as above, the in-vehicle device 3 generates output data, and outputs the generated output data as voice from the voice output part 32. This allows the user to listen to the music selected on the second mobile terminal 2b.

Next, the in-vehicle device 3 outputs the instruction to replay music to the third mobile terminal 2c. The third mobile terminal 2c performs the processing for replay by selecting a piece of music at random among the music data stored in the own terminal. That is, in the same manner as above, the in-vehicle device 3 generates output data, and outputs the generated output data as voice from the voice output part 32. This allows the user to listen to the music selected on the third mobile terminal 2c.

Then, the in-vehicle device 3 outputs the instruction to replay music to the first mobile terminal 2a, repeating the same processing above. As explained so far, in the embodiment the in-vehicle device 3 sequentially selects one of the mobile terminals 2 connected to the in-vehicle device 3, and plays at random the music data stored in the selected mobile terminal. This affords equal replay even when a plurality of mobile terminals are carried into a vehicle, preventing, for example, unequal replaying of the music data stored mostly in a specific mobile terminal.

The number of the mobile terminals connected to the in-vehicle device 3 is not limited to three, and may be two, four or more. In the embodiment, in the case where one of the mobile terminals becomes disconnected during the execution of the processing for replay, the same processing for replay can be continued by use of other connecting mobile terminals. The order of the mobile terminals for replay is not limited to this, and other arbitrary order may be available as long as the order can afford equal replay.

In the embodiment as above, in the case where the plurality of mobile terminals 2 are connected to the in-vehicle device 3, the list of the music data stored in the individual mobile terminals 2 is displayed in association with the mobile terminals individually. This facilitates grasping which of the mobile terminals 2 stores target music data.

In the case where a plurality of mobile terminals store the same music data, the area displaying a piece of music data is divided into plural parts which are shown in different display styles (pattern, color, etc.). This prevents redundant display and enables association with individual mobile terminals.

When one of the connecting mobile terminals becomes disconnected, the list of the music data stored in the disconnected mobile terminal is grayed out. This facilitates grasping that the grayed-out music data are stored in the disconnected mobile terminal. Further, the grayed-out music data are hidden after predetermined time elapses. This prevents unavailable music data from being displayed indefinitely. In the case where the disconnected mobile terminal becomes connected again in predetermined time, the original display is brought back. This allows the same display without preparing the display data again, which reduces the load of processing on the in-vehicle device 3 and at the same time provides user-friendly display.

Further, a user can hide from other users the music data that the user wants to set as closed data, which can improve user's convenience. In addition, the music data to be hidden and the group to be hidden to are associated and the association is stored. This allows the music data to be set automatically as closed data when the group is connected at another time. This improves user's convenience further.

In the case where an in-vehicle device and a plurality of mobile terminals are connected, music data are replayed in the manner where one of the mobile terminals is selected sequentially. This prevents unequal replaying of the music data stored in a specific mobile terminal. As a result, this affords equal replay.

2. Modification

The embodiment of the invention has been explained so far. However, the invention is not limited to the embodiment explained above, and may provide various modifications. Hereafter, these modifications are explained. All embodiments including the embodiment explained above and the embodiments to be explained below can be arbitrarily combined with others.

In the embodiment explained above, when a mobile terminal becomes disconnected, the music data stored in the mobile terminal are grayed out. However, the invention is not limited to this. In an example, in the case where the association with the mobile terminal is displayed by color, color density may be changed. Specifically, in the case where red is used for expressing the association with a first mobile terminal 2a, the color red is soften when the first mobile terminal 2a becomes disconnected. This method facilitates grasping which of the mobile terminals stores the disconnected music data.

In the embodiment explained above, as the method for replaying music data, one of the mobile terminals connected to the in-vehicle device 3 is selected sequentially, and the music data stored in the selected mobile terminal is replayed at random. However, the invention is not limited to this. Other configuration may be adopted as long as the same mobile terminal is not just selected successively.

Here is an example case where three mobile terminals of a first mobile terminal 2a, a second mobile terminal 2b and a third mobile terminal 2c are connected to an in-vehicle device 3. After the music data stored in the first mobile terminal 2a is replayed, a mobile terminal other than the first mobile terminal 2a, that is, either the second mobile terminal 2b or the third mobile terminal 2c, is to be selected. In the case where the second mobile terminal 2b is selected as the next mobile terminal, after the music data stored in the second mobile terminal 2b is replayed, either the first mobile terminal 2a or the third mobile terminal 2c is to be selected. As above, the adoption of the method for not successively selecting the same mobile terminal also prevents unequal replay.

The mobile terminal for replay may be selected in consideration of battery residual quantity. Specifically, an in-vehicle device 3 checks the battery residual quantity of each of a plurality of mobile terminals 2, and excludes the mobile terminals having the battery less than a predetermined quantity from selection candidates. Each of the mobile terminals 2 transmits the information on its own battery residual quantity to the in-vehicle device 3, which allows the in-vehicle device 3 to grasp the battery residual quantity of each of the mobile terminals 2. Then, when determining that the battery residual quantity of any of the mobile terminals 2 is less than the predetermined quantity at the time of performing the processing for replaying music data, the in-vehicle device 3 excludes the mobile terminal from selection candidates, and performs the processing for replaying music data as explained above by use of other mobile terminals.

The predetermined quantity in this case is as low as the battery residual quantity may fall down to approx. 0% if the mobile terminal executes the processing for replaying music data. An arbitrary value, for example, 3% or less, 5% or less, or 10%/o or less may be set as the quantity. This can prevent the battery residual quantity from running out due to the execution of the processing for replaying music data.

In the case where the battery residual quantity is equal to or less than the predetermined quantity, unlike the configuration to exclude the mobile terminal from selection candidates, the configuration to inform a user of that user's mobile terminal is selected may be adopted. In an example, in the case of replaying the music data stored in the mobile terminal having lower battery residual quantity, the fact that the battery residual quantity of the mobile terminal is low is displayed on a display unit (pop up display).

In other available configuration in consideration of the battery residual quantity, a mobile terminal may be selected at a frequency corresponding to its battery residual quantity. Here is an example where the battery residual quantity of a first mobile terminal 2a is 80%, the battery residual quantity of a second mobile terminal 2b is 60%, and the battery residual quantity, of a third mobile terminal 2c is 40%. In this case of replaying nine pieces of music data (when selecting a mobile terminal nine times), the first mobile terminal 2a is selected four times, the second mobile terminal 2b is selected three times, and the third mobile terminal 2c is selected twice. This prevents unequal replay, and thereby prevents the battery residual quantity of only either one of the mobile terminals from running out unequally.

The mobile terminal during being charged from the power source of a vehicle may be deemed to have more battery residual quantity than its actual quantity. In this case, the mobile terminal may be deemed to have, for example, 100% of battery residual quantity. Priority for use is given to the mobile terminal during being charged for use so as to reduce the battery consumption of the mobile terminals not during being charged as much as possible.

During replaying a piece of music data, another piece of music data for replay may be selected in advance as the next music data or the music data after next. In this case, in an in-vehicle device, the music data for replay after the current music data is registered as reservation music. Further, the in-vehicle device may display on a display unit a reservation list indicating the list of the registered reservation music.

Next, an example of the reservation list is explained. First, when a piece of music is selected as the next replay music, the replay music after next or the like during replaying a piece of music, the in-vehicle device stores various types of information for a reservation list in a memory. FIG. 14 shows an example of the reservation list. As shown in FIG. 14, the reservation list stores various types of information, for example, title, artist, storage terminal, replay terminal, connection flag, battery residual quantity, disconnection time, and replay status.

The title and the artist indicate the title and the artist name of the music data that is reserved for replay. The storage terminal is the information that specifies the mobile terminal storing the reserved music data. In the case where a plurality of mobile terminals store the music data, the information that specifics all of the storing mobile terminals is stored.

The replay terminal is the information that specifies the mobile terminal to replay the reserved music data. In the case where the reserved music data is stored in one mobile terminal, the mobile terminal becomes the replay terminal necessarily. In the case where the reserved music data is stored in a plurality of mobile terminals, one of the mobile terminals becomes the mobile terminal for replay, and the information that specifies the mobile terminal for replay is stored. In an example, in the case where a method for sequentially selecting a mobile terminal is adopted, the mobile terminal whose order is the next to the mobile terminal that has replayed one before the current music becomes the mobile terminal for replay.

The connection flag is the flag that shows the status of the connection between the mobile terminal storing the music data and the in-vehicle device. The flag "ON" expresses connection; while the flag "OFF" expresses disconnection. The battery residual quantity is the information on the battery residual quantity of the mobile terminal that replays music data. The disconnection time is the information on the time elapsing after a mobile terminal, if any, becomes disconnected from the in-vehicle device. FIG. 14 shows that the mobile terminal 2a is disconnected and five minutes have passed since the start of its disconnection. The replay status is the information on the determination on whether to replay or put off the reserved music data. The replay status is determined based on various types of information explained above, for example, the connection status of a replay terminal.

Figure 15A:
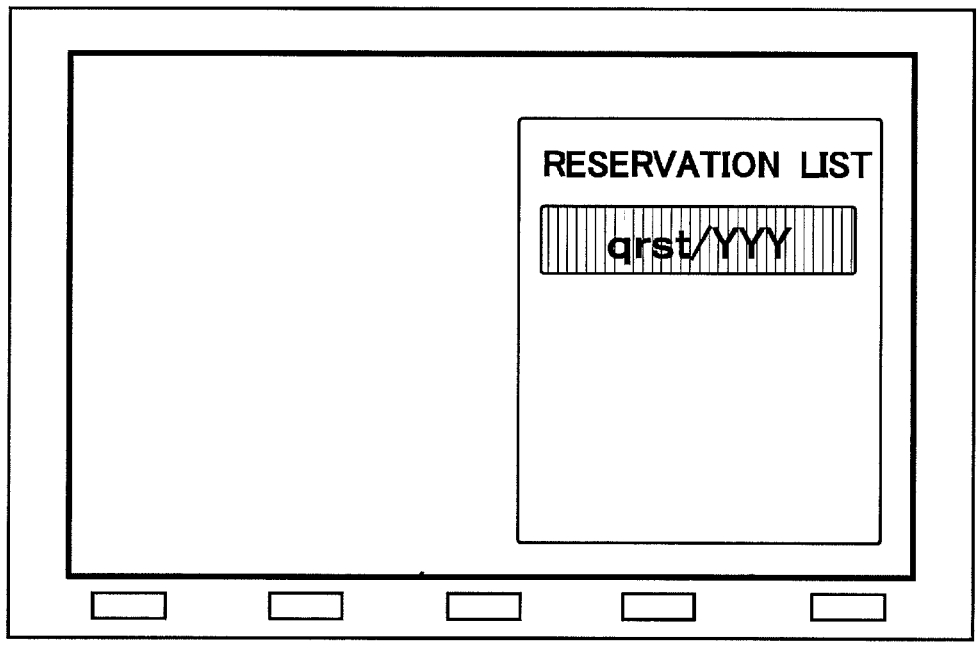
FIGS. 15A and 15B show display examples of the reservation list.

As above, the reservation list stores various types of information, and the in-vehicle device may display a part or the whole of the stored information as the reservation list on a display unit. The following explanation is about the reservation list based on FIG. 15A and FIG. 15B.

Explanation is performed in an example of the state where the music: title is "abcd;" and artist name is "zzz" (hereinafter, described as "title/artist name"), is being replayed. When the music "qrst/YYY" is selected as the next music for replay, an in-vehicle device executes reservation processing for storing prescribed information for a reservation list, preparing the reservation list, and displaying the prepared reservation list on a display unit. In this case also, the reserved music data is displayed in association with the mobile terminal storing the data in the same way as the embodiment above. The individual association may be expressed by use of different display styles such as vertical lines and horizontal lines, or by use of different colors such as red and blue.

Figure 15B:
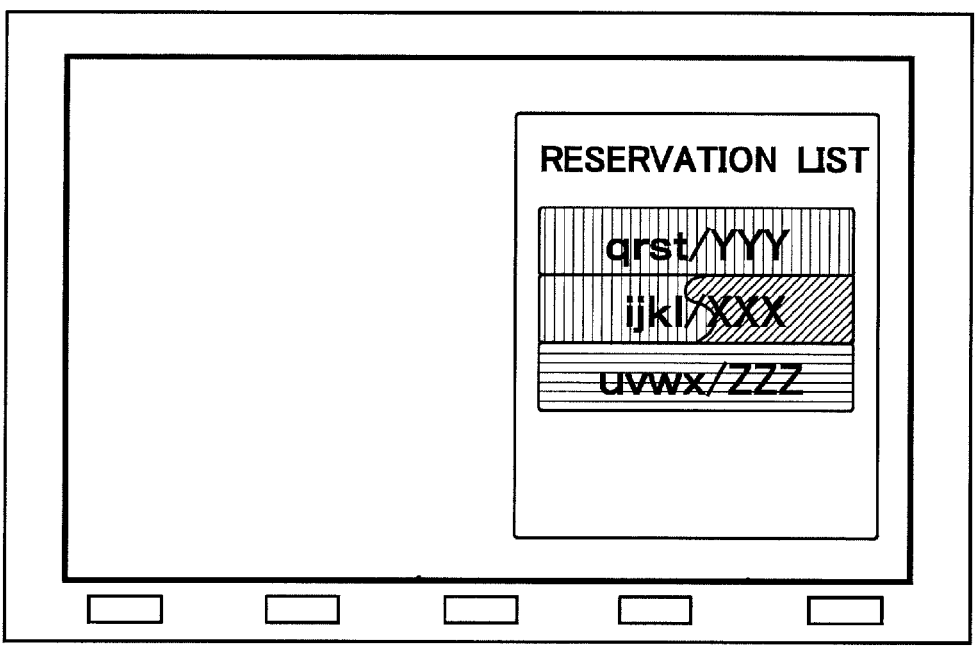

When the music "ijkl/XXX" is selected as the music after next, the in-vehicle device executes the reservation processing for registering the music as the one after the music "qrst/YYY," updating the reservation list, and displaying the updated reservation list. When the music "uvwx/ZZZ" is selected as the one after the music "ijkl/XXX," the in-vehicle device executes the reservation processing for registering the music "uvwx/ZZZ" as the one after the music "ijkl/XXX," updating the reservation list, and displaying the updated reservation list as shown in FIG. 15B. In this case also, the reserved music data are displayed in association with the mobile terminals storing the data individually.

In the example shown in FIG. 15B, the music data "ijkl/XXX" is stored in a plurality of mobile terminals. In such a case, the applicable area in the reservation list is divided into plural parts expressed by plural display styles. This facilitates grasping that a plurality of mobile terminals store the music data. A similar procedure is repeated afterward. Reserving music for replay as above allows a user to grasp next music and afterward in advance.

If any of the mobile terminals becomes disconnected from the in-vehicle device after executing the reservation processing, it is advisable to display the music data stored in the disconnected mobile terminal in a different display style from the one when being connected, for example, gray-out display. This facilitates easily grasping that the mobile terminal storing the music data is disconnected and that the music data is not available for replay.

In the embodiments explained above, various functions are implemented by software, specifically by CPU arithmetic processing based on programs. However, some of these functions may be implemented by electrical hardware circuits. Contrarily, in the embodiments explained above, some of the functions implemented by hardware circuits may be implemented by software.

As explained so far, in the invention, in the case where a plurality of mobile terminals store the same content data, the content data is not displayed for each of the plurality of mobile terminals, but the area for displaying the content data is divided into plural parts. This prevents redundant display, and associates the content data with individual mobile terminals storing the content data.

In the invention, even when a mobile terminal becomes disconnected from a content display apparatus, a user can grasp that the mobile terminal is disconnected. In addition, when the mobile terminal becomes connected again, displaying the same display data as the one before the disconnection facilitates grasping the association between the content data and the mobile terminal.

In the invention, the content data stored in a specific mobile terminal are not replayed successively, which avoids unequal replay. This affords substantially-equal replay even in the case where a plurality of mobile terminals are connected.

While the invention has been shown and explained in detail, the foregoing description is in all aspects illustrative and not restrictive. It is therefore understood that numerous other modifications and variations can be devised without departing from the scope of the invention.

What is claimed is:

1. A content output system comprising:
a plurality of mobile terminals that store content data; and
a content display apparatus that is communicatively connected to the plurality of mobile terminals, obtains the content data from the mobile terminals, and displays the content data on a display, wherein
the content display apparatus displays the content data on the display in association with the mobile terminals that store the content data, and
in a case where the plurality of mobile terminals store a same piece of content data, the content display apparatus divides an area showing the same piece of content data into plural parts, and displays each of the plural parts in association with each of the mobile terminals storing the same piece of content data.

2. The content output system of claim 1, wherein
in a case where the plurality of mobile terminals store a same piece of content data, the content display apparatus displays the same piece of content data in association with each of the plurality of mobile terminals storing the same piece of content data.

3. The content output system of claim 1, wherein
in a case where any of the mobile terminals becomes disconnected from the content display apparatus, the content display apparatus displays the content data stored in the disconnected mobile terminal by a different color from a color used during connection to the content display apparatus.

4. The content output system of claim 3, wherein
in a case where the disconnected mobile terminal becomes reconnected to the content display apparatus, the content display apparatus displays the content data stored in the reconnected mobile terminal by the color used during the connection to the content display apparatus before the disconnection.

5. The content output system of claim 1, wherein
in a case where, on one of the mobile terminals, the content data stored in the one mobile terminal is set as closed data, the content display apparatus does not display the content data set as closed data.

6. The content output system of claim 1, wherein
the content display apparatus displays the content data on the display in association with the mobile terminals that store the content data by indicating on the display the one or more of the plurality of mobile terminals that contain each piece of the content data.

7. The content output system of claim 6, wherein
the content display apparatus displays the content data on the display without displaying any of the pieces of the content data more than once even when a piece of the content data is contained on more than one of the mobile terminals.

8. A content output system comprising:
a plurality of mobile terminals that store content data; and
a content output apparatus that is communicatively connected to the plurality of mobile terminals, obtains the content data from the mobile terminals, and outputs the content data, wherein
the content output apparatus sequentially selects one of the plurality of mobile terminals, and outputs the content data stored in the selected mobile terminal, and
in a case where the plurality of mobile terminals store a same piece of content data, the content output apparatus divides an area showing the same piece of content data into plural parts, and outputs each of the plural parts in association with each of the mobile terminals storing the same piece of content data.

9. A content output system comprising:
a plurality of mobile terminals that store content data; and
a content output apparatus that is communicatively connected to the plurality of mobile terminals, obtains the content data from the mobile terminals, and outputs the content data, wherein
the content output apparatus selects one of the plurality of mobile terminals that is different from a mobile terminal storing the content data being output by the content output apparatus, and outputs the content data stored in the selected mobile terminal after the content data being output by the content output apparatus, and
in a case where the plurality of mobile terminals store a same piece of content data, the content display apparatus divides an area showing the same piece of content data into plural parts, and outputs each of the plural parts in association with each of the mobile terminals storing the same piece of content data.

10. A content output system comprising:
- a plurality of mobile terminals that store content data; and
- a content output apparatus that is communicatively connected to the plurality of mobile terminals, obtains the content data from the mobile terminals, and outputs the content data, wherein
- when the plurality of mobile terminals store a piece of content data requested to be output, the content output apparatus obtains the piece of content data from one of the mobile terminals having a largest battery residual quantity, and
- in a case where the plurality of mobile terminals store a same piece of content data, the content display apparatus divides an area showing the same piece of content data into plural parts and outputs each of the plural parts in association with each of the mobile terminals storing the same piece of content data.

11. A content output method comprising the steps of:
- (a) communicatively inter-connecting a content display apparatus with a plurality of mobile terminals;
- (b) obtaining content data from the plurality of mobile terminals to the content display apparatus; and
- (c) displaying, on a display of the content display apparatus, the content data in association with the mobile terminals storing the content data,
- wherein in a case where the plurality of mobile terminals store a same piece of content data, the content display apparatus divides an area showing the same piece of content data into plural parts, and displays each of the plural parts in association with each of the mobile terminals storing the same piece of content data.

12. The content output method of claim 11, wherein
the displaying step includes displaying the content data on the display by indicating on the display the one or more of the plurality of mobile terminals that contain each piece of the content data.

13. The content output method of claim 12, wherein
the displaying includes displaying the content data on the display without displaying any of the pieces of the content data more than once even when a piece of the content data is contained on more than one of the mobile terminals.

\* \* \* \* \*